No. 662,374. Patented Nov. 20, 1900.
T. B. DOOLEY.
ANTIFRICTION BEARING.
(Application filed Apr. 24, 1900.)
(No Model.)
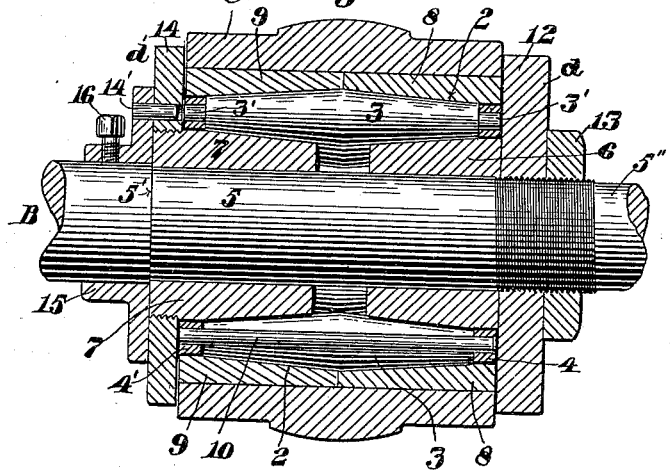
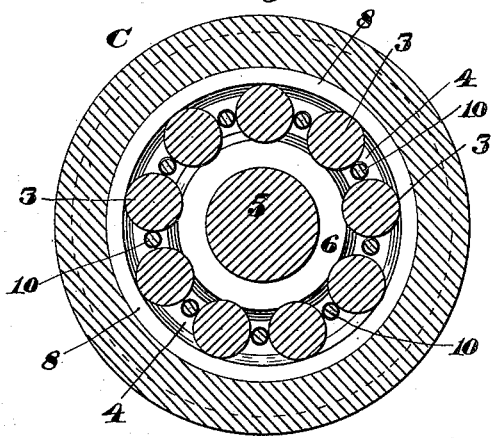
Witnesses:
Nathan C. Lombard 2nd.
Edward H. Temple.
Inventor:
Thomas B. Dooley,
by Lombard & Whitney
Attys.

UNITED STATES PATENT OFFICE.

THOMAS B. DOOLEY, OF MALDEN, MASSACHUSETTS.

ANTIFRICTION-BEARING.

SPECIFICATION forming part of Letters Patent No. 662,374, dated November 20, 1900.

Application filed April 24, 1900. Serial No. 14,078. (No model.)

*To all whom it may concern:*

Be it known that I, THOMAS B. DOOLEY, a citizen of the United States of America, and a resident of Malden, Middlesex county, Massachusetts, have invented certain new and useful Improvements in Antifriction-Bearings, of which the following is a specification.

This invention relates to antifriction-bearings generally, and more particularly to that class of bearings known as "roller-bearings."

The object of the present invention is to furnish a roller-bearing of improved, simplified, and efficient construction and organization especially adapted for use in connection with wheels of vehicles, such as automobiles, wherein it is desirable to provide a long antifriction-bearing surface extending substantially the entire length of that portion of the axle or shaft receiving the load or substantially the entire length of the hub and to so arrange the elements of the bearing as to obviate the torsional strains, misalinement, injurious end thrusts, uneven wear, and cramping inherent to many bearings of known construction.

With this object in view the invention consists in certain details of construction and in the combination and arrangement of the several coöperative elements of the bearing, substantially as hereinafter described, and more particularly pointed out in the claims.

In the drawings accompanying and forming part of this specification, Figure 1 is a central longitudinal section, with parts in elevation, of one form of roller-bearing embodying this invention; and Fig. 2 is a central transverse section of said bearing.

Similar characters refer to like parts in both figures of the drawings.

As a preamble to the detailed description of my improved bearing it is desired to state that by the term "shaft" as employed herein is meant any suitable centrally-disposed member—such as a shaft, spindle, axle, or journal of any kind—whether the same is stationary or rotative, and by the term "casing" as herein employed is meant any suitable housing member disposed about said central member which will be rotative if the central member is stationary and will be stationary if the central member is rotative, and the terms "stationary" member and "rotative" member as herein employed may apply either to the central member or external housing member without choice.

In the preferred construction and organization thereof shown in the accompanying drawings the antifriction-bearing comprises a central supporting member or shaft B, an external housing member or casing C, two externally-tapered sleeves or cones 6 and 7, mounted upon the shaft, with their apexes or smaller ends in juxtaposition, and which sleeves or cones are fixed as regards rotative movements with relation to the shaft, but are capable of slight adjustment longitudinally of said shaft, two opposing internally-tapered or internally-conical sleeves 8 and 9, fitting the interior of the external casing and each having its bearing-face tapered conically on lines in opposition with the tapered bearing-face of the opposing sleeve secured to the shaft, whereby an annular raceway 2 is formed between the sleeves on the shaft B and the sleeves in the casing C and which raceway in longitudinal section is in the form of a double cone, with the larger cross-sectional area at the center thereof, a circuit of relatively-separated double-cone rollers 3, fitting said raceway and having their peripheries in bearing engagement with the opposing bearing-faces thereof and also having reduced journals 3' at opposite ends thereof, a roller-cage including two roller-separating rings 4 and 4', secured together by tie-rods and located in the opposite ends of the raceway 2 and having perforations to receive the journals of said rollers, and independent confining means or devices $d$ and $d'$ in connection with opposite ends, respectively, of the casing.

The shaft or central member B is shown having a reduced central portion 5, forming a shoulder 5', and also having its right-hand end (see Fig. 1) further reduced, as at 5'', and screw-threaded to receive the confining means $d$.

The external casing C or housing member is shown in the nature of an open-ended cylinder having its inner face parallel to the axis of the shaft B and which cylinder is of an internal diameter considerably greater than the external diameter of said shaft.

One of the externally-tapered sleeves, as 7, mounted on the shaft B, is shown having its outer end projecting beyond the end face of the internally-tapered sleeve 9 and this end face of the casing C, said sleeve 7 being externally screw-threaded at this end to receive a confining ring or nut, as hereinafter described.

The circuit of rollers 3, which are disposed in separated relation in the raceway 2, are each shown in the form of a double cone—that is, each roller is tapered from the central portion thereof inward toward opposite ends to correspond to the longitudinal contour of said raceway. These rollers are shown (see Fig. 1) having diametrically-reduced journals 3' at opposite ends thereof located in transverse perforations in the two rings 4 and 4' of the roller-cage, each journal being in practice of a diameter slightly less than the diameter of the perforation in which it is seated to permit lateral adjustment of said rollers in said perforations, this adjustment being effected by an inward movement of the externally-tapered sleeve 7.

The roller-cage consists of the two rings 4 and 4', surrounding, respectively, the outer ends of the two externally-tapered sleeves 6 and 7 and located in the outer ends of the raceway 2 between said sleeves 6 and 7 and the adjacent internally-tapered sleeves 8 and 9, and a series of tie-rods 10, connecting said ring and disposed in parallelism with the axis of and between adjacent rollers 3. It will be obvious, however, that the invention is not limited to the specific construction of the elementary features of the roller-cage, as these may be modified within certain limits without departure from this invention.

The confining means $d$ at one end of the shaft preferably comprises an internally-screw-threaded ring 12, screwed upon the end of the shaft, with its inner face in juxtaposition to the adjacent end of the casing C, and a nut 13, screwed upon this end of the shaft and bearing against said ring. The confining means $d'$, which also embodies locking means, is shown consisting of an internally-screw-threaded ring 14, screwed upon the outer end of the externally-tapered sleeve 7, with its inner face in juxtaposition to the adjacent end of the casing, a collar 15, mounted for adjustment upon the enlarged end of the shaft B, with its inner face in bearing engagement with the ring 14 and having a locking-pin 14' fitting a hole in said ring 14, and a set-screw 16, extending transversely through the collar and bearing at its inner end against the shaft, whereby to hold the collar against movement on the sleeve 7. It is obvious that the means for locking the ring 14 against rotation may be modified within the purview of this invention.

When it is desired to take up wear between the bearing-faces of the roller and the bearing-faces of the raceway, it is simply necessary to loosen the confining means $d'$ and move the sleeve 7 inward, the collar 15 being adjusted as required.

I claim—

1. A roller-bearing comprising a stationary member and a rotative member; two internally-conical sleeves fitting the interior of one member and two externally-tapered sleeves fitting the exterior of the other member and forming between them an annular raceway, the opposing bearing-faces of which are tapered on relatively oblique lines from the center inwardly toward opposite ends thereof, and one of which externally-tapered sleeves extends beyond the end face of one of the internally-conical sleeves; a roller-cage including two transversely-perforated rings located in opposite ends of the raceway between opposing sleeves; a plurality of double-cone rollers disposed between, and bearing against, the opposing faces of the two opposing sets of sleeves and having reduced journals loosely supported in the perforations in said rings; confining means in connection with one end of said cage; and confining and adjusting means in connection with the opposite end of said cage, and including a ring screwed upon the exterior of the extended externally-tapered sleeve, a collar in bearing engagement with said ring, and means between said ring and collar for locking the ring against rotation.

2. In a roller-bearing the combination, with a shaft and with a casing surrounding said shaft, of two externally-tapered sleeves and two internally-tapered sleeves, the former of which are secured to the shaft for rotation therewith and for adjustment longitudinally thereof and the latter of which are secured to the interior of the casing and the two opposing sets of sleeves being disposed to form between them a raceway of the form of a double cone; perforated rings surrounding the outer ends of the externally-tapered sleeve; double-cone rollers supported in said raceway and having reduced journals at opposite ends loosely contained in the perforations in said rings; a confining device screwed upon one end of the shaft and bearing against the outer end of one externally-tapered sleeve; a confining-ring screwed upon the outer end of the other externally-tapered sleeve with its inner face in juxtaposition to the outer face of the casing; a collar supported upon the shaft for adjustment longitudinally thereof and with its inner face in bearing engagement with said ring; a set-screw extending through said collar for holding it in adjusted position on the shaft; and a pin on said collar entering a recess in said ring and holding the same against rotation with respect to the sleeve on which it is mounted.

Signed by me at Boston, Massachusetts, this 20th day of April, 1900.

THOMAS B. DOOLEY.

Witnesses:
WALTER E. LOMBARD,
EDWARD H. TEMPLE.